United States Patent [19]
Swick

[11] Patent Number: 6,053,988
[45] Date of Patent: *Apr. 25, 2000

[54] METHOD FOR MAKING PISTON RINGS

[76] Inventor: E. Grant Swick, 28W629 Stearns Rd., Bartlett, Ill. 60103

[*] Notice: This patent is subject to a terminal disclaimer.

[21] Appl. No.: 09/157,115

[22] Filed: Sep. 18, 1998

Related U.S. Application Data

[63] Continuation-in-part of application No. 08/577,058, Dec. 22, 1995, Pat. No. 5,809,643.

[51] Int. Cl.[7] .................................................... C23C 8/24
[52] U.S. Cl. ...................... 148/226; 148/230; 29/888.07; 29/888.074; 29/557
[58] Field of Search .................. 29/888.07, 888.074, 29/557; 148/226, 230

[56] References Cited

U.S. PATENT DOCUMENTS

| | | |
|---|---|---|
| 1,018,149 | 2/1912 | Wright . |
| 1,450,346 | 4/1923 | Anderson . |
| 2,279,133 | 4/1942 | Cross . |
| 2,280,552 | 4/1942 | Somes . |
| 2,453,330 | 11/1948 | Marshall . |
| 2,748,453 | 6/1956 | Haldeman . |
| 4,937,937 | 7/1990 | Bruce . |
| 5,068,963 | 12/1991 | Bruce . |

*Primary Examiner*—Ngoclan Mai
*Attorney, Agent, or Firm*—James E. Brunton

[57] ABSTRACT

A method and apparatus for making a piston ring in which a metal strip having a first coefficient of expansion is coiled about a special mandrel having a second greater coefficient of expansion and a threaded form that has a zero helix angle along most of its circumference or perimeter and then a relatively steep helix angle for a short distance.

10 Claims, 2 Drawing Sheets

METHOD FOR MAKING PISTON RINGS

BACKGROUND OF THE INVENTION

This is a Continuation-In-Part application of U.S. Ser. No. 08/577,058 filed Dec. 22, 1995 U.S. Pat. No. 5,809,643.

FIELD OF THE INVENTION

The present invention relates generally to a method and apparatus for making rings. More particularly, the invention concerns a method and apparatus of making piston rings for internal combustion engines.

DISCUSSION OF THE INVENTION

Piston rings of the character used in internal combustion engines are generally formed from metal by a process which typically includes a number of steps, such as casting the metal into rough shape and then cleaning, cutting, machining, chemically treating, and finishing the casting to form the finished piston ring. This type of process is typically expensive, inefficient, and extremely labor intensive.

A number of attempts have been made in the past to develop methods for making piston rings which are more efficient, less expensive, and which produce piston rings of higher quality than those made of conventional casting processes. For example, U.S. Pat. No. 2,279,133 issued to Cross describes a method for making piston rings from wire by heating the wire and then winding the heated wire onto a cooled mandrel to produce a body of helical formation. The helical body is then cut up into individual rings and the helical rings thus produced are trued to a flat form.

Another prior art method for making piston rings from wire is described in U.S. Pat. No. 2,748,453 issued to Haldeman. The Haldeman process involves bending a metallic strip to form a ring, placing the ring on a mandrel having an exterior surface substantially identical to the desired form of the inner surface of the ring, applying radially inwardly directed forces to the ring to secure the ring to the mandrel and then heating the ring to relieve any internal stresses which have been formed therein. The ring formed by the Haldeman process is moderately noncircular and expands to seal a piston cylinder more efficiently than the traditional circular shaped piston rings. Such a non-circular ring is also disclosed in the very old U.S. Pat. No. 1,293,633 issued to Norman.

U.S. Pat. No. 4,937,937 issued to Bruce also describes a method of making piston rings of a non-circular configuration from a metal strip. In accordance with the Bruce method, a metal strip is fed into a guide means to align the strip and feed it into a first bending means wherein the strip is bent into a regular curve of a predetermined radius. The curved strip is then fed into a second bending means to increase the radii of curvature of all of the constituent portions of the strip to form the ring to the predetermined, non-circular profile.

Currently some piston ring manufacturers use pre-heat treated material which is wound upon a conventional spring-making machine such as rotating or fixed curling tools to form a helical body. The helical body is then cut to make, helical rings which are trued to plane in a clamping device that removes the helix.

A significant advance in the methods and apparatus for making piston rings is disclosed in co-pending U.S. application Ser. No. 08/577,058 filed by the present inventor on Dec. 22, 1995. The inventions disclosed in the present application comprise an improvement over those described in this later mentioned application. Accordingly, U.S. application Ser. No. 08/577,058 is incorporated by reference as though fully set forth herein.

The thrust of the present invention is to provide an improved method and apparatus for producing high quality piston rings at a significantly lower overall cost than those produced by known prior art processes. As will be better understood from the discussion which follows, this is accomplished by winding an elongated metal strip of a special configuration onto a mandrel of unique design having a plurality of circumferentially extending, transversely spaced grooves which have a generally zero helix angle along a major portion of their circumference.

SUMMARY OF THE INVENTION

It is an object of the present invention to provide a novel method and apparatus for making an interrupted ring. More particularly, it is an object of the invention to provide an interrupted piston ring which will precisely sealably conform to the cylinder wall of an internal combustion engine.

Another object of the invention is to provide a method and apparatus of the aforementioned character in which the metal strip from which the ring is made is coiled about a special mandrel having a threaded form that has a zero helix angle along most of its circumference or perimeter and then a relatively steep helix angle for a short distance.

Another object of the invention is to provide a method and apparatus for making a ring as described in the preceding paragraph in which a metal strip is coiled about a specially configured mandrel which is provided with a thread form having a zero helix angle that is interrupted by longitudinally extending slots which are spaced apart by a distance generally corresponding to the desired gap to be provided in the piston ring.

Another object of the invention is to provide a method as described in the preceding paragraph in which, during the coiling operation the metal strip is formed at specific locations along its length into angled configuration.

Another object of the invention is to provide a method described in the preceding paragraph in which, following the forming and coiling operation, the metal strip is cut to remove the angled portions of the strip to form a plurality of substantially planar shaped, split rings.

Another object of the invention is to provide a method as described herein in which the coefficient of thermal expansion of the mandrel about which the metal strip is wound is slightly greater than that of the metal strip.

Another object of the invention is to provide a method as described in the preceding paragraph which includes the step of heating the metal strip and the mandrel to a temperature that will induce a tensile stress in the metal strip sufficient to provide a "set" to the windings, and will also ensure a clean release of the rings from the arbor after the arbor is cooled.

DESCRIPTION OF THE INVENTION

Figure 1:
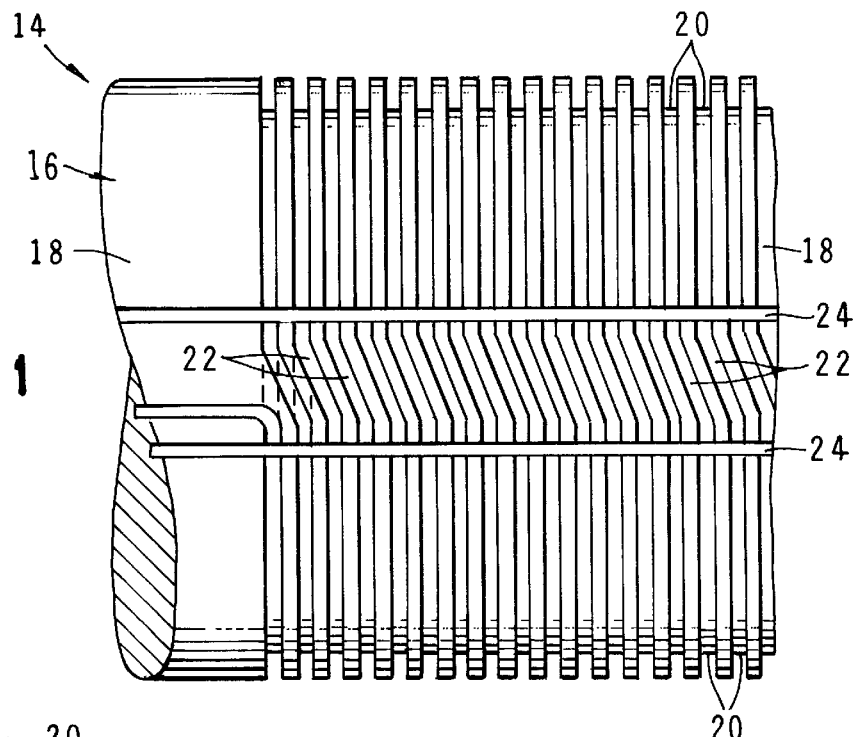
FIG. 1 is a fragmentary, side-elevational view of one form of the coiling mandrel of the apparatus of the present invention.
Figure 3:
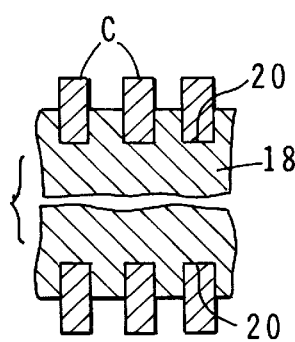
FIG. 3 is a greatly enlarged view taken along lines 3—3 of FIG. 2.
Figure 2:
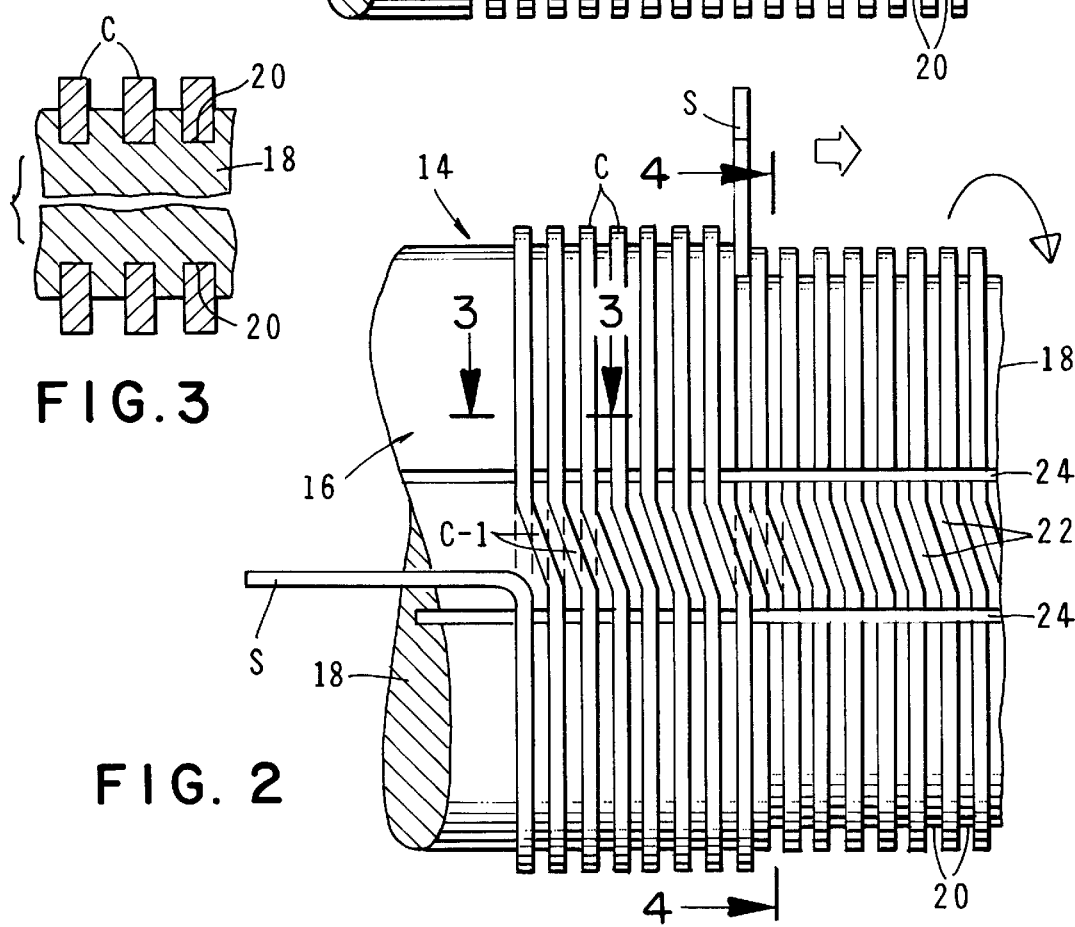
FIG. 2 is a fragmentary, side-elevational view similar to FIG. 1, but showing the step of coiling a metal strip about the coiling mandrel.
Figure 4:
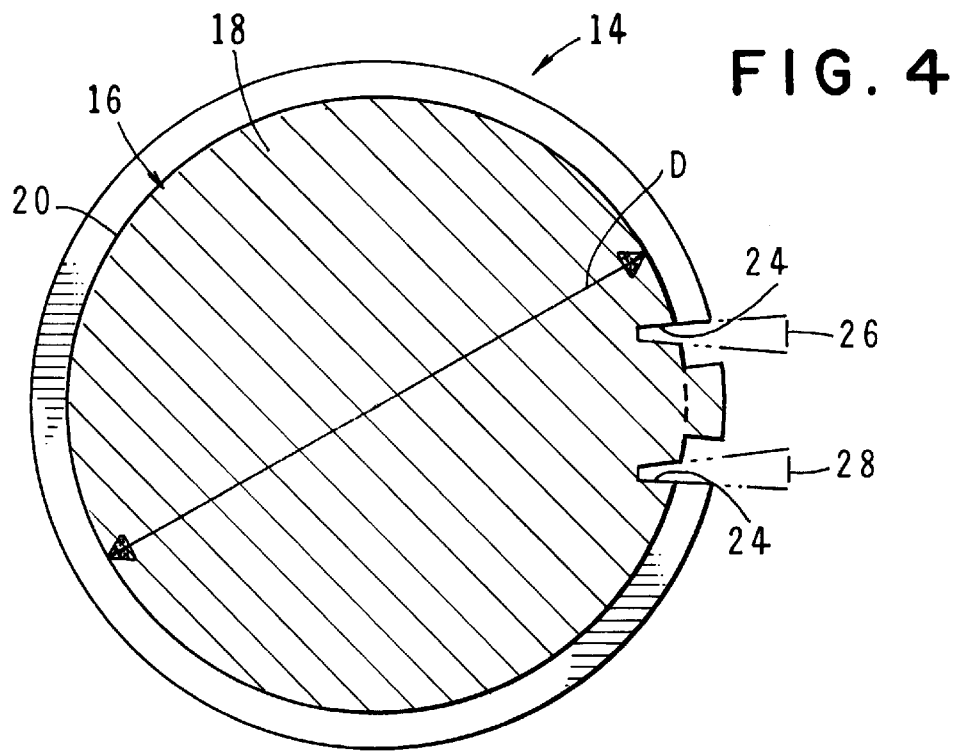
FIG. 4 is a cross-sectional view taken along lines 4—4 of FIG. 2.

Referring to FIGS. 1, 2, and 3, one form of the apparatus of the invention for making interrupted rings is there shown and generally designated by the numeral 14. The apparatus of this form of the invention is similar to that shown in FIGS. 8, 9, and 9A of incorporated by reference application Ser. No. 08/577,058. However in this latest form of the invention the forming mandrel 16 has a body portion 18 which, as shown in FIG. 4, has a diameter "D" and is circular in cross section. Body portion 18 is provided with a plurality of longitudinally spaced-apart, circumferentially extending grooves 20 which have a generally zero helix angle along a major portion of their circumference. However, each of the grooves 20 also includes a helix angle shaped portion designated in FIG. 1 by the numeral 22. With this construction, a metal strip "S", the character of which will presently be described, is wound about the mandrel in the manner shown in FIGS. 2 and 3. As the mental strip is wound about the mandrel, or body portion 18, it will conform to the shape of the grooves formed in the mandrel and the helix angle portions 22 thereof will automatically cause formation of helix angle segments "C-1" of the character shown in FIG. 2. As indicated in FIG. 3, each of the coils "C" has a generally zero helix angle along the major portion of their circumference and each has the helix angle segment "C-1" formed along a minor portion of the circumference by the helix angle groove portions 22.

Figure 5:
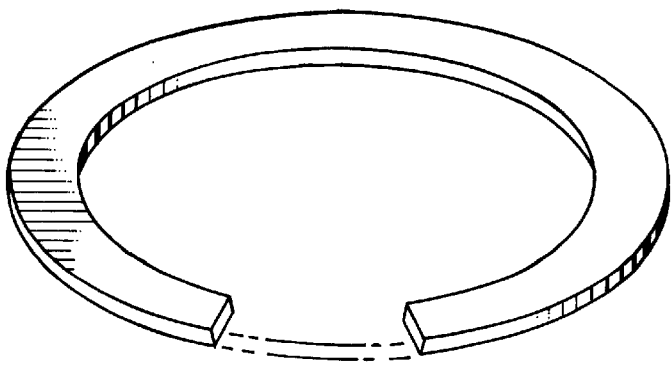
FIG. 5 is a generally perspective view of one form of split ring produced by the method of the invention.
Figure 6:
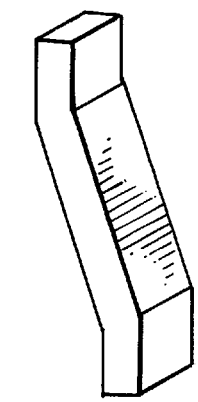
FIG. 6 is a generally perspective, fragmentary view of the helix angle segment of one coil of the coiled body shown in FIG. 2 after it has been cut from the coiled body to form the split ring shown in FIG. 5.

Cutting tool receiving channels 24 are formed in mandrel 18 and, function to receive cutting tools 26 and 28 which function to cut the various coils to form interrupted rings having the general character shown in FIG. 5 and the removed helix angle segments have the general configuration shown in FIG. 6. Reference should be made to incorporated by reference Ser. No. 08/577,058 for a more complete discussion of this cutting step. Those skilled in the art will have no difficulty in constructing cutting means which embody cutting tools 26 and 28 and which include means for moving the tools into cutting engagement with the various coils of the metal strip.

While various metals can be used to produce the piston rings of the present invention, stainless steels are particularly well suited for the purpose including types 420, 440A, 440B, and 440C. The specific chemical analyses of these grades of stainless are well known to those skilled in the art and are readily available from a number of technical publications. The first coefficient of thermal expansion for these alloys varies from approximately $10 \times 10^{-6}$ in/in/°K to approximately $12 \times 10^{-6}$ in/in/°K. All these grades may be characterized as being hardenable (carbon content varies by grade from approximately 0.25% for 420 to approximately 1.10% for 440C) and are all relatively high chromium (approximately 13% for 420 and 17% for the 440 series). Similarly, all may be heat treated and partially tempered prior to or after winding to produce a "desired" balance of hardness and ductility. By way of example, type 440C rings may be heat treated by heating the ring mandrel assembly to about 1850–1900° Fahrenheit, and then quenching the heated metal in oil. For thinner sections, such as piston rings or a hollow mandrel, quenching may also be accomplished by air quenching, which typically will produce a brinell hardness well in excess of 600.

Following heat treating, the material can be suitably tempered (drawn) at various temperatures to reduce the hardness and brittleness and to increase ductility. For example 2 hours at 1000 F. will reduce the hardness to approximately 535 brinnel and increase the impact values from approximately 30 ft.-lb. as quenched to 42 ft.-lb. after tempering.

A novel feature of the apparatus of the present invention resides in the fact that the material selected for the construction of the mandrel 18 has a coefficient of thermal expansion slightly greater than that of the ring material. By way of example, the mandrel can be constructed from a stable, corrosion resistant material such as 301 stainless steel which has a second coefficient of thermal expansion of on the order of $17 \times 10^{-6}$ in/in/°K. The 300 series stainless steels are well suited for use in constructing the mandrel since they are not hardenable and thus heating and cooling will have little effect on the material. The benefit of this important coefficient of expansion feature is that the tempering temperature will induce a tensile stress in the ring material, providing a "set" to the windings; and when cooled the mandrel will be slightly smaller than the "set rings" thus incurring a clean release of the severed rings from the mandrel, as well as providing the desired "set". The advantage of the "set" is the removal of minor imperfections (either in the material itself, or induced by the process of winding) in the final ring. It is to be understood, several materials other than 301 stainless could be used to construct mandrel 18, to accomplish the desired result.

The specific heat treatment and tempering procedures may be varied to suit the specific objectives of the product designer. Generally the object is to create the desired "set" and also to create a tempered martensite with uniformly distributed carbides. In a similar manner the exact chemical analysis of the raw material may also be varied to meet particular end product requirements.

As more fully discussed in incorporated by reference application Ser. No. 08/577,058, the method of making interrupted rings using the apparatus of the invention, comprises the first step of coiling the specially configured metal ring about the generally circular shaped mandrel 18. After a suitable length of strip is wound on the mandrel, the final end of the strip is appropriately secured to maintain the tension in the strip on the mandrel during subsequent processing. This done, the coiled body is thoroughly cleaned while it remains in position on the mandrel. Following this cleaning step, the cleaned mandrel and coil assembly is placed in a suitable heat treatment furnace where, depending upon the type of metal used, the coiled body is heat treated by raising the temperature of the furnace to a range of between about 1500 degrees and 2200 degrees Fahrenheit. Following the heat treating step, the mandrel and coil assembly is then removed from the heat treatment furnace and quenched in a suitable quenching apparatus. This quenching can be accomplished by either oil or air quenching processes of a character well known to those skilled in the art.

Following the quenching step, the metal coil, while still in place on the mandrel can be tempered at various temperatures by placing the assemblage into a tempering furnace of a character well known to those skilled in the art. Once again, tempering can be accomplished at various temperatures optimal for reducing the hardness and brittleness of the metal coil and to suitably increase the ductility of the coil.

Following the tempering step, the coil is, once again, carefully cleaned and then, while still on the mandrel, is preferably inserted into a nitriding furnace 82. The nitriding furnace is also of a character well known to those skilled in the art and functions to controllably nitride the outer surface of each ring that makes up the coil. In this regard, due to the novel design of the mandrel, the outer surface of each ring of the coil is exposed so that nitriding advantageously occurs on the most desired surfaces of the rings, namely the surfaces that will ultimately engage the cylinder wall of the engine. The nitriding furnace and the techniques for accomplishing the nitriding step are well known to those skilled in the art and need not be discussed in detail herein.

Following the nitriding step, the mandrel and coil assembly is removed from the nitriding furnace and the individual rings which make up the coil are cut in the manner previously described using the cutting means which comprise the previously identified cutting tools 26 and 28 (FIG. 4). Cutting of the coils, produces the split rings of the invention and also produces the waste segments, such as the segments shown in FIG. 6.

Either prior to the cutting step or after the interrupted rings have been formed in the manner described in the preceding paragraphs, minor final handwork can be accomplished and the rings carefully inspected to insure compliance with the required dimensional tolerances dictated by the end use which is to be made of the rings.

It is to be understood that depending upon the end use to be made of the rings of the invention, the steps of the method may vary somewhat from those described herein. Further, in some instances, it may be necessary to accomplish additional steps in producing the desired end product. For example, for certain end product uses, it may be necessary to electroplate the exposed surface of the interrupted rings with a material such as chromium or like hard material. Uniquely the plating process can utilize a masking procedure that masks the entire coil that circumscribes the mandrel assembly. The outer surface of the mask can then be removed to expose only those surfaces that are to be plated. This masking and masking removal step can be easily accomplished using the apparatus of the present invention because the surface on which the mask is to be removed is readily accessible.

Additionally, titanium nitride surface coating could be applied to the metal coil produced by the method of the invention in a customary manner as, for example, through chemical vapor deposition processes accomplished in a suitable vacuum chamber.

Having now described the invention in detail in accordance with the requirements of the patent statutes, those skilled in this art will have no difficulty in making changes and modification in the individual parts or their relative assembly in order to meet specific requirements or conditions. Such changes and modifications may be made without departing from the scope and spirit of the invention, as set forth in the following claims.

I claim:

1. A method of making interrupted rings using a forming mandrel of generally circular cross section having a plurality of circumferentially extending grooves, each of which is interrupted along its circumference, comprising the steps of:

(a) coiling an elongated metal strip around the mandrel by urging the metal strip into the circumferentially extending grooves to form a body comprising a plurality of circumferentially extending coils; and (b) cutting each said coil of said body to remove therefrom an arcuate segment so as to form a plurality of interrupted rings.

2. A method as defined in claim 1 including the further step of heat treating said coils of said body.

3. A method as defined in claim 1 including the further step of tempering said coils of said body.

4. A method as defined in claim 1 including the further step of nitriding said coils of said body.

5. A method as defined in claim 1 in which said elongated metal strip is coiled around the mandrel to form a body comprising a plurality of circumferentially extending coils having a generally zero helix angle along a major portion of their circumference and a helix angle segment along a minor portion of their circumference.

6. A method of making interrupted rings from an elongated metal strip having a first coefficient of expansion using a forming mandrel having a second coefficient of expansion greater than said first coefficient of expansion, said mandrel having a plurality of circumferentially extending longitudinally spaced apart grooves, each of which is interrupted along its circumference, said method comprising the steps of:

(a) coiling the elongated metal strip around the mandrel to form a body comprising a plurality of coils having a generally zero helix angle along a major portion of their circumference and a helix angle segment along a minor portion of their circumference; and (b) cutting said plurality of coils to remove said helix angle segments to form a plurality of split rings.

7. A method as defined in claim 6 including the further step of heat treating said body prior to cutting said coils of said body.

8. A method as defined in claim 6 including the further step of tempering said body prior to cutting said coils of said body.

9. A method as defined in claim 8 including the further step of nitriding said coils of said body prior to cutting said coils.

10. A method as defined in claim 9 including the further step of polishing said coils of said body prior to cutting said coils.

* * * * *